United States Patent [19]

Sekmakas et al.

[11] 4,036,800

[45] July 19, 1977

[54] ELECTRODEPOSITION OF AQUEOUS DISPERSIONS OF AMINE FUNCTIONAL URETHANE COPOLYMERS

[75] Inventors: Kazys Sekmakas, Chicago; Raj Shah, Schaumburg, both of Ill.

[73] Assignee: DeSoto, Inc., Des Plaines, Ill.

[21] Appl. No.: 583,655

[22] Filed: June 4, 1975

[51] Int. Cl.$^2$ .................. C08K 3/18; C08L 61/20; C08L 75/04
[52] U.S. Cl. ..................... 260/29.2 TN; 204/181; 260/18 TN; 260/29.3; 260/29.4 UA; 260/857 UN; 260/859 R; 428/425; 428/460
[58] Field of Search ............ 260/29.4, 29.4 UA, 29.3, 260/29.2 TN, 18 TN, 18 EP, 18 PT, 77.5 MA, 77.5 AM; 204/181, 859 R

[56] References Cited

U.S. PATENT DOCUMENTS

| | | | |
|---|---|---|---|
| 3,758,427 | 9/1973 | Katsibas | 260/19 EP |
| 3,804,786 | 4/1974 | Sekmakas | 260/29.2 TN X |

*Primary Examiner*—Theodore E. Pertilla
*Attorney, Agent, or Firm*—Dressler, Goldsmith, Clement, Gordon & Shore, Ltd.

[57] ABSTRACT

Amine functional urethane copolymers dispersible in water with the aid of a solubilizing acid are provided by copolymerizing (A) 5–75% by weight of an ethylenically unsaturated urethane amine free of epoxy groups and formed by reacting an epoxy-functional urethane in which the urethane groups are ethylenically unsaturated with a monosecondary amine; and (B) the balance consisting essentially of copolymerizable monoethylenically unsaturated monomers. These monomers preferably include amine-functional monomers to further increase the amine functionality.

23 Claims, No Drawings

ELECTRODEPOSITION OF AQUEOUS DISPERSIONS OF AMINE FUNCTIONAL URETHANE COPOLYMERS

This invention relates to amine functional urethane copolymers, to stable aqueous dispersions containing the same at a pH close to neutral, and to the electrodeposition of such aqueous dispersion at the cathode of a unidirectional electrical system.

In accordance with this invention, amine functional urethane copolymers dispersible in water with the aid of a solubilizing acid are provided by copolymerizing monoethylenically unsaturated monomers with ethylenically unsaturated urethane amine formed by reacting an epoxy-functional urethane in which the urethane groups are ethylenically unsaturated with a monosecondary amine to provide tertiary amine groups in an unsaturated product free of epoxy groups. The epoxy-functional urethane is most practically provided by reacting an organic diisocyanate with an ethylenically unsaturated alcohol, preferably a fatty alcohol, the isocyanate functionality being in excess to produce an isocyanate-terminated ethylenically unsaturated fatty urethane which is then reacted with the hydroxy functionality contained in an hydroxy-functional polyepoxide. The epoxy functionality which is retained in the reaction with isocyanate is then consumed, at least partially by reaction with a monosecondary amine, thereby introducing tertiary amine goups. The product after reaction with amine can be described as an ethylenically unsaturated fatty urethane amine, and it is copolymerizable with monoethylenically unsaturated monomers, preferably including amine-functional monomers to increase the amine functionality and improve dispersibility in water.

The amine copolymer is stably dispersible in water at a pH in excess of about 5.0, up to about 7.5, and it can be electrodeposited at the cathode, preferably together with an aminoplast curing agent, and cured to provide cured coatings which combine high corrosion resistance with great hardness and flexibility.

Starting with commercially available raw materials, we must first consider the ethylenically unsaturated alcohol. These can be monoethylenic or polyethylenic, the latter being more usual in the preferred fatty alcohols. Of course, the term alcohol used in the absence of qualification denotes a monohydric alcohol, and no functionality other than the unsaturation relied upon for copolymerization and the single hydroxy group is contemplated. Unsaturated fatty alcohols which resist homopolymerization are preferably selected, these being illustrated by the polyethylenically unsaturated fatty alcohols oleyl alcohol, linoleyl alcohol, linolenyl alcohol, and the like. Fatty alcohols denote alcohols containing from 8 to 22 carbon atoms, preferably 10–18 carbon atoms. Allyl and methallyl alcohols are monoethylenic and will further illustrate the useful alcohols. The unsaturation is preferably inert to amino hydrogen, so acrylic unsaturation is less desirable.

The unsaturated alcohol is reacted with a substantial stoichiometric excess of organic diisocyanate to produce an isocyanate terminated unsaturated urethane. The excess should be large enough to minimize dimer formation though the presence of some dimer can be tolerated. Generally, these should be at least about 1.8 equivalents of isocyanate per equivalent of hydroxy. Excess unreacted diisocyante should also be minimized since it serves to increase the molecular weight of the diepoxide, but this is of secondary significance, particularly where diepoxides of intermediate molecular weight are used since some molecular weight increase is not harmful, and there is ample hydroxy functionality available. In preferred practice, one can tolerate up to about 2.4 equivalents of isocyanate per equivalent of hydroxy, and the most preferred range is from 1.9–2.2.

The class of organic diisocyanates is well known, and it will be illustrated with toluene diisocyanate.

The next starting material is an hydroxy functional polyepoxide, these being preferably a diglycidyl ether of a dihydric organic compound, the common epoxy resins which are diglycidyl ethers of bisphenols being particularly preferred. These diepoxides in practice have a 1,2-epoxy equivalency of from about 1.2 to about 2.0, preferably from 1.4 to 2.0.

As noted above, the diglycidyl ethers of bisphenols are preferred, and those having a molecular weight of from about 400 to about 4,000 are particularly preferred since these present a plurality of both ether groups and hydroxy groups. These polyepoxides are well known and available in commerce.

The term "bisphenol" denotes a pair of phenolic groups separated by an intervening divalent alkylene group. The commercial materials are derivatives of bisphenol "A".

From the standpoint of the commercially available materials, the Shell product Epon 1001 is preferred, this material having an average molecular weight of 1,000, a melting point of 67°–74° C., an epoxy value of 0.20 equivalents per 100 grams, and an hydroxy value of 0.32 equivalent per 100 grams. Other commercial epoxy resins of known characteristics which are also appropriate for use herein are Epon 834, Epon 864, Epon 1001, and Epon 1004.

The reaction between the isocyanate functionality and the hydroxy functionality in the two reactions under consideration are straight addition reactions (adductions) which form urethane linkages. All that is needed is to cook the reactants together at moderate temperature as illustrated hereinafter.

The reaction with the isocyanate groups has first formed an unsaturated isocyanate functional urethane, and then an unsaturated epoxy urethane. The proportion of the unsaturated isocyanate to the epoxy resin can vary considerably, but broadly one can use enough to consume from 10% to 100% of the hydroxy groups in the diepoxide. In preferred practice, the stoichiometry is on a molar basis, at least about 0.9 mol of unsaturated urethane being used per mol of diepoxide so that most of the diepoxide is later converted to copolymer. Up to about 2.0 mol of unsaturated urethane may be used per mol of diepoxide, assuming a sufficient hydroxy functionality, before gelation tendencies are encountered. Some excess unreacted isocyanate can be tolerated because, on subsequent reaction with monosecondary amine, more hydroxy groups are generated which can tie up the excess isocyanate groups.

While the unsaturated epoxy-functional urethane is preferably formed as described, other procedures are possible. Thus, the hydroxy groups of the polyepoxide can first be reacted with excess diisocyanate, and the unsaturated alcohol can then be adducted with the isocyanate so formed.

We now have an unsaturated urethane containing epoxy groups, and these epoxy groups can be reacted with monosecondary amines as described in U.S. Pat. No. 3,804,786.

The monosecondary amines which are useful herein are illustrated by diethanol amine, dimethanol amine, dipropanol amine, etc. These hydroxy amines are particularly preferred since they introduce hydroxy functionality to aid water dispersibility. While other amines such as diethyl amine or dipropyl amine are useful, the hydroxy amines are superior.

The result of all of the foregoing is a copolymerizable ethylenically unsaturated amine-functional urethane which is incorporated in a copolymer with various monoethylenic monomers to constitute from 5-75% of the copolymer, preferably from 20-60%.

This unsaturated amine-functional urethane must be free of epoxy groups, since these cause viscosity instability. It is preferred to use the monosecondary amine to consume all of the epoxy groups, since this yields the best water solubility. However, some of the epoxy groups can be consumed in some other manner, as by esterification with an acid, such as acetic acid, or by etherification with an alcohol, such as butyl alcohol. It is preferred to use enough secondary amine to provide at least one tertiary amine group per molecule of amine-epoxide reaction product.

Referring more particularly to the balance of the copolymer, this balance should consist essentially of copolymerizable monoethylenically unsaturated monomers, a portion of which is normally amine-functional to enhance the desired water solubility with the aid of a solubilizing acid. Such solubility is aided by the presence of from 2-20%, preferably from 6-15%, based on the weight of the copolymer, of monoethylenically unsaturated amine. The amine may be primary, secondary, or tertiary and, while monoamines are primarily contemplated polyamines, and even hydroxy functional amines, are considered to be useful. Tertiary monoamines are particularly preferred to provide greatest solubility in water at highest pH.

As already indicated, the balance of the copolymer consists essentially of monoethylenic monomers. Considering first monomers that are not amine-functional, these may be reactive or nonreactive. Any nonreactive monoethylenic monomer such as styrene, vinyl toluene, methyl methacrylate, ethyl acrylate, dibutyl maleate, acrylonitrile, and the like is appropriate. Styrene is particularly preferred to constitute at least 50% of the monoethylenic monomer component. The larger the proportion of unsaturated urethane, the less nonreactive monoethylenic monomer will be used.

The monoethylenically unsaturated monomers used to form the amine copolymer will preferably include other water soluble reactive monomers, such as acrylamide, N-methylol acrylamide, or hydroxy ethyl acrylate to increase functional reactivity, especially with aminoplast or phenol formaldehyde curing agents which are desirably incorporated in the aqueous electrocoating bath for electrical codeposit at the cathode with the amine copolymers of this invention.

Reactive monoethylenic monomers are useful since they increase the reactive functionality, and they may also assist in helping solubility at the higher pH levels which are desired herein. On this basis, acrylamide, N-methylol acrylamide, hydroxyethyl acrylate, and similar monomers providing the amide, the N-methylol or the hydroxy group are desirably present, the total proportion of such reactive monomers being desirably in the range of from 5-30%, preferably in the range of 10-25%, based on the total weight of the polymer. The etherified N-methylol group is considered to be equivalent to the N-methylol group itself since the etherifying alcohol is released on baking.

The class of monoethylenic unsaturated amines is itself well known, this invention being illustrated by the commercially available material dimethyl aminopropyl methacrylate. However, dimethyl aminoethyl methacrylate, monomethyl aminoethyl methacrylate, aminoethyl methacrylate, and the corresponding acrylates, crotonates, and the like are all fully useful herein. Other amine-functional monomers are illustrated by aminoethyl methacrylate, and t-butyl aminoethyl methacrylate.

Monoethylenically unsaturated tertiary amino amides are also useful in this invention, and these have the formula:

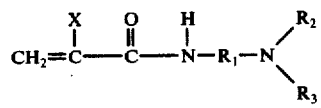

where X is hydrogen or methyl, $R_1$ is $C_1$ - $C_4$ alkylidene, and $R_2$ and $R_3$ and $C_1$ - $C_4$ alkyl, preferably both methyl.

These unsaturated amino amides are illustrated by dimethylaminopropyl methacrylamide which has the formula:

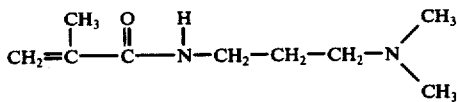

The corresponding acrylate is considered to be equivalent and the use of other alkylidene groups such as the methylidene, ethylidene, and butylidene groups, does not significantly alter the properties. While the dimethyl amino species is distinctly preferred, the corresponding diethyl, dipropyl, or dibutyl amino compounds are also useful.

Up to about 30% of the copolymer may be constituted by the above unsaturated amino amides, preferably from 5-15%.

It is desired to point out that the monomers which are useful in the production of amine copolymers which may be dissolved in water and applied by electrophoresis at the cathode are themselves well known, and the above discussion of appropriate monomers will have this in mind.

Copolymerization is carried out in conventional fashion, the monomers being preferably dissolved in organic solvent (water miscible solvents are conveniently selected since they are desirably present in the final water dispersion) and heat is employed together with a conventional free radical generating catalyst to cause addition polymerization and the production of a linear soluble copolymer.

The copolymers which are dispersed in the electrocoating bath are desirably obtained and employed in the form of a solution in water miscible organic solvent, the solvent being desirably present in an amount of at least 10% by weight, based on the weight of the copolymers which are dispersed in the water phase. These water miscible solvents are preferably present in an amount not in excess of 150%, based on the weight of the dispersed copolymers. The solvent is most desirably present in an amount of from 30-125%, on the same basis. The class of water miscible organic solvents useful herein is well known, and these are illustrated in the accompanying examples.

From the standpoint of water solutions, it will be appreciated that the copolymers are dispersed in water with the aid of an acid which solubilizes the resin, the specific nature of the acid being of secondary significance. Inorganic acids such as hydrochloric acid or sulfuric acid are useful, though these do not provide the approximately neutral pH and noncorrosive environment which are preferred. It is presently preferred to employ organic acids such as formic acid, acetic acid, lactic acid or 2-pyridine carboxylic acid. Propionic acid and butyric acid are also useful. The preferred solubilizing acids can be characterized as saturated monocarboxylic acids having a dissociation constant in the range of from about 3.0 to about 5.6.

In the preferred practice of this invention, the final water solution is desired to have a pH in the range of 5-7.5, more preferably pH 5.5-7. When corrosion resistant equipment is available, lower pH can be tolerated.

Neutralization with acid in this invention is usually 50% to 100% of the amino groups, preferably from 60% to 90%.

It is desired that the aqueous coating compositions of this invention be thermosetting and the thermosetting cure is usually provided by the presence in the water medium of the coating of dispersed heat-hardening formaldehyde condensate.

The aqueous compositions of this invention containing the dispersed amine-functional copolymer thus have incorporated therein from 5%-40%, preferably 10%-30%, based on the total weight of resin, of a heat-hardening formaldehyde condensate, which can be dispersed in the aqueous medium. The class of heat-hardening formaldehyde condensates is a well known class including aminoplast resins and phenolic resins. Typical aminoplast resins, all of which are formaldehyde condensates, are urea-formaldehyde, hexamethoxy methyl melamine and water dispersible transethers thereof with ethanol or other lower alcohol, benzoguanamine-formaldehyde and the like.

It is also possible to use heat-hardening water soluble or dispersible phenol-formaldehyde resins (phenolic resins), but since these do not include nitrogen atoms they do not have any strong tendency to migrate toward the cathode. To accentuate the desired electrophoretic movement, the water dispersible heat-hardening phenolic resin is heat reacted with the amine copolymer to cause a precondensation to take place, and the two resins to become compatibilized with one another. The fact of reaction is easily observed by the increase in viscosity which takes place. Thus, phenolic resins are useful herein, but it is usually preferred to avoid the needed precondensation, and an advantage of this invention is to obtain superior corrosion resistance without reliance upon phenolic resin.

Suitable phenolic resins are illustrated by the well known nongelled alkaline condensates of phenol with excess formaldehyde known at "A" stage resols.

The aqueous electrocoating bath is normally formulated to have a resin solids content in the range of 2-20%, preferably 5-15%, and the electrodeposited films are baked to cure the same, baking temperatures of 250° F. to 600° F. for periods varying from about 20 seconds at the highest temperature to about an hour at the lowest temperature being conventional. Preferred bakes are from 350° F. to 475° F. for from about 2 to 40 minutes.

Throughout this specification, and in the examples and claims which follow, all parts are by weight unless otherwise specified.

EXAMPLE 1

Preparation of Water Soluble Cationic Urethane Resin

Parts of Weight

135 —Unsaturated Fatty Alcohol (note 1)
  Charge into reactor and heat to 120° C.
87—Toluene Diisocyanate
  Add to reactor over 1 hour period at 120° C.
255—70% Epoxy resin solution in methyl ethyl ketone (note 2)
  Add to reactor over 1 hour period at 120° C.
  Hold for 1 hour and add:
29.5—Diisopropanol amine
450—2-butoxy ethanol.
  Hold for 2 hours at 120° C..
380—Styrene
80—Hydroxy ethyl acrylate
122—Dimethyl aminopropyl-methacrylamide
17—Cumene-hydroperoxide
8—Ditertiary butyl peroxide
14—Tertiary dodecyl mercaptan
  Premix and above monomers and catalyst and add to reactor over a 3 hour period at 120° C.
  Hold one hour.
5—Cumene-hydroperoxide — add and hold 1 hour.
5—Cumene-hydroperoxide — add and hold 1 hour.
100—2-Butoxy ethanol — add to adjust viscosity to $Z_5$-$Z_6$ (Gardner) and to provide a final solids content of 64.6%.

Preparation of Pigmented Electrocoat Coating Utilizing Example 1 Polymer

Pigment Dispersion
128 grams Titanium dioxide (rutile)
70 grams Resin of Example 1
30 Grams 2-Ethoxy ethanol
1.9 gram Acetic acid
  Disperse the pigment using high speed agitation (Waring Blendor).

Preparation of Electrocoating Bath
42 grams of above Pigment Dispersion
84 grams — Resin of Example 1
14.8 grams — Methylated-ethylated benzoguanamine resin (note 3)
2.2 grams — Acetic acid
850 grams — Deionized water
  Final solids: 9.8%
  pH: 5.8.

Utilizing zinc treated steel panels as the cathode, films are deposited at 70 volts for 60 seconds. The panels are cured for 20 minutes at 450° F. The cured panels exhibit an excellent uniform appearance, free of craters and other film imperfections.

Film Properties
Pencil hardness: 5H
Direct impact: 50 inch/lbs.
Flexibility: Pass ¼ inch Mandrel
Film thickness: 0.55 mils
5% salt fog resistance: Pass 500 hours without rusting
1% synthetic detergent resistance at 165° F.: Pass 100 hours.

Note 1 — The unsaturated fatty alcohol is oleyl alcohol having an iodine value of about 79, and an hydroxyl value of about 215. The commercial product ADOL 33 (Ashland Oil, Inc. may be used. ADOL 33 has an iodine value of 75-82 and an hydroxyl value of 205-225.

Note 2 — The epoxy resin is a diglycidyl ether of bisphenol A having an epoxide equivalent weight of 900. The commercial material Epon 1004 (Shell) may be used.

The invention is defined in the claims which follow. We claim:

1. An amine functional urethane copolymer dispersible in water with the aid of a solubilizing acid and which is a copolymer of:
   A. 5-75% by weight of an ethylenically unsaturated urethane amine free of epoxy groups and formed by reacting a 1,2-epoxy functional urethane in which the urethane groups are ethylenically unsaturated with a monosecondary amine; and
   B. the balance consisting essentially of copolymerizable monoethylenically unsaturated monomers.

2. A water dispersible copolymer as recited in claim 1 in which said epoxy functional urethane is the urethane reaction product of an hydroxy functional 1,2-polyepoxide with an ethylenically unsaturated monoisocyanate which is the urethane reaction product of 1.8-2.4 isocyanate equivalents of organic diisocyanate with one equivalent of ethylenically unsaturated alcohol.

3. A water dispersible copolymer as recited in claim 2 in which said ethylenically unsaturated alcohol is a fatty alcohol.

4. A water dispersible copolymer as recited in claim 3 in which said fatty alcohol is selected from oleyl, linoleyl and linolenyl alcohols.

5. A water dispersible copolymer as recited in claim 2 in which said hydroxy functional polyepoxide is a diepoxide having a 1,2-epoxy equivalency of from about 1.2 to about 2.0.

6. A water dispersible copolymer as recited in claim 5 in which said diepoxide is a diglycidyl ether of a bisphenol having a 1,2-epoxy equivalency of from 1.4 to 2.0, and a molecular weight of from about 400 to about 4000.

7. A water dispersible copolymer as recited in claim 2 in which said reaction product of hydroxy functional polyepoxide with ethylenically unsaturated isocyanate terminated urethane consumes from 10% to 100% of the hydroxy groups in the diepoxide.

8. A water dispersible copolymer as recited in claim 7 in which at least about 0.9 mol up to about 2.0 mol of unsaturated urethane is used per mol of polyepoxide.

9. A water dispersible copolymer as recited in claim 1 in which said monosecondary amine is an hydroxy amine.

10. A water dispersible copolymer as recited in claim 1 in which said monosecondary amine provides at least one tertiary amine group per molecule of the amine-epoxide reaction product formed therefrom.

11. A water dispersible copolymer as recited in claim 5 in which said monosecondary amine is used to consume all of the epoxide groups in said diepoxide.

12. A water dispersible copolymer as recited in claim 1 in which said unsaturated urethane amine component (A) constitutes from 20%-60% of the copolymer.

13. A water dispersible copolymer as recited in claim 1 in which said monoethylenically unsaturated monomers include from 2-20% by weight of the copolymer of monoethylenically unsaturated amine.

14. A water dispersible copolymer as recited in claim 13 in which said unsaturated amine is a tertiary amine.

15. A water dispersible copolymer as recited in claim 14 in which said unsaturated amine is dimethyl aminopropyl methacrylamide.

16. A water dispersible copolymer as recited in claim 1 in which said unsaturated urethane amine component (A) constitutes from 20%-60% of the copolymer, and the balance of the copolymer consists essentially of copolymerized monoethylenically unsaturated monomers including from 6-15% of the copolymer of tertiary amine and at least 50% of said monomers being styrene.

17. A water dispersible copolymer as recited in claim 1 in which said monomers include water soluble monomers providing amide, hydroxy, or N-methylol functionality in a total amount of from 5-30% of the copolymer.

18. An amine functional urethane copolymer dispersible in water with the aid of a solubilizing acid and which is a copolymer of:
   A. 20-60% by weight of an ethylenically unsaturated urethane amine free of epoxy groups and formed by reacting a monosecondary amine with a polyepoxide reaction product of an hydroxy functional polyepoxide which is a diglycidyl ether of a bisphenol having a 1,2-epoxy equivalency of from 1.4 to 2.0, and a molecular weight of from about 400 to about 4000, with an ethylenically unsaturated isocyanate terminated urethane, said ethylenically unsaturated isocyanate terminated urethane being the reaction product of from 1.8-2.4 isocyanate equivalents of organic diisocyanate with one equivalent of ethylenically unsaturated fatty alcohol, there being at least about 0.9 mol up to about 2.0 mol of unsaturated urethane per mol of polyepoxide; and
   B. the balance consisting essentially of copolymerizable monoethylenically unsaturated monomers including from 2-20% by weight of the copolymer of monoethylenically unsaturated tertiary amine.

19. A water dispersion of the copolymer defined in claim 1 dispersed in water with the aid of a solubilizing acid, said dispersion having a pH in the range of 5.0-7.5.

20. A water dispersion as recited in claim 19 in which said water dispersion further includes an aminoplast or phenol-formaldehyde curing agent.

21. An aqueous electrocoat bath comprising the water dispersion of claim 20 having a resin solids content of from 4-20% by weight.

22. An aqueous electrocoat bath as recited in claim 21 in which said bath has a pH in the range of 5.5-7.0.

23. An aqueous electrocoat bath as recited in claim 22 in which said copolymer is solubilized with acetic acid.

* * * * *